(12) United States Patent
Hirata et al.

(10) Patent No.: US 11,042,463 B2
(45) Date of Patent: Jun. 22, 2021

(54) COMPUTER, BOTTLENECK IDENTIFICATION METHOD, AND NON-TRANSITORY COMPUTER READABLE STORAGE MEDIUM

(71) Applicant: Hitachi, Ltd., Tokyo (JP)

(72) Inventors: Takumi Hirata, Tokyo (JP); Kazuki Ootsubo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 466 days.

(21) Appl. No.: 16/121,522

(22) Filed: Sep. 4, 2018

(65) Prior Publication Data

US 2019/0146892 A1 May 16, 2019

(30) Foreign Application Priority Data

Nov. 14, 2017 (JP) .............................. JP2017-218981

(51) Int. Cl.
*G06F 11/34* (2006.01)
*G06F 11/30* (2006.01)

(52) U.S. Cl.
CPC ...... *G06F 11/3452* (2013.01); *G06F 11/3065* (2013.01); *G06F 11/3433* (2013.01); *G06F 11/3006* (2013.01)

(58) Field of Classification Search
None
See application file for complete search history.

(56) References Cited

U.S. PATENT DOCUMENTS

| | | | | |
|---|---|---|---|---|
| 7,127,555 B2* | 10/2006 | Takeda | .................... | G06F 3/061 711/111 |
| 2009/0216624 A1* | 8/2009 | Kato | ........................ | G06N 5/02 705/7.38 |
| 2009/0235269 A1* | 9/2009 | Nakajima | ........... | G06F 11/3485 718/104 |
| 2013/0283246 A1* | 10/2013 | Krajec | ................ | G06F 11/3466 717/130 |
| 2015/0199252 A1* | 7/2015 | Ilangovan | ........... | G06F 11/3409 702/186 |
| 2016/0011925 A1* | 1/2016 | Kulkarni | ............. | G06F 11/3006 714/57 |

(Continued)

FOREIGN PATENT DOCUMENTS

JP 2011-146074 A 7/2011

*Primary Examiner* — Lina M Cordero
(74) *Attorney, Agent, or Firm* — Procopio, Cory, Hargreaves & Savitch LLP

(57) ABSTRACT

A computer, which is configured to manage a resource for which a metric being an indicator for evaluating performance of the resource is to be measured, the computer being coupled to, via the interface, a management target system including a plurality of resources, and storing correlation information for managing a correlation coefficient indicating a degree of correlation between metrics, and the computer being configured to: detect a trigger event to identify a bottleneck based on a metric value of a monitored metric of a monitored resource; identify a related resource having a coupling relationship with the monitored resource; identify a correlation metric that is highly correlated with the monitored metric from among metrics of the related resource based on the correlation information; identify a combination of the related resource and the correlation metric as a bottleneck candidate.

12 Claims, 10 Drawing Sheets

(56) References Cited

U.S. PATENT DOCUMENTS

2017/0052826 A1\* 2/2017 Sasaki ................... G06F 9/5083
2017/0054610 A1\* 2/2017 Vangala ................ H04L 43/028
2017/0329660 A1\* 11/2017 Salunke ................ G06F 11/079
2018/0196835 A1\* 7/2018 Anand ................... G06F 16/217

\* cited by examiner

| CONVERSION SOURCE 801 | | CONVERSION DESTINATION 802 | | FUNCTION ID 803 |
|---|---|---|---|---|
| RESOURCE NAME 811 | METRIC 812 | RESOURCE NAME 821 | METRIC 822 | |
| LDEV15 | IOPS | VM21 | Response Time | FUNCTION 1 |
| LDEV15 | IOPS | VM21 | Read Latency | FUNCTION 2 |
| Port3 | Transfer Rate | FC Switch4 | RX Rate | FUNCTION 3 |
| LDEV21 | Read IOPS | Port4 | Transfer Rate | FUNCTION 4 |
| ⋮ | ⋮ | ⋮ | ⋮ | ⋮ |

FIG. 8

| FUNCTION ID 901 | FUNCTION 902 | PARAMETER 903 | | | |
|---|---|---|---|---|---|
| | | t1 | t2 | ... | tn |
| FUNCTION 1 | CONVERSION DESTINATION METRIC VALUE = t1 * (CONVERSION SOURCE METRIC VALUE) + t2 | 1.2431 | 0 | ... | - |
| FUNCTION 2 | CONVERSION DESTINATION METRIC VALUE = t1 * (CONVERSION SOURCE METRIC VALUE) + t2 | 100 | 0 | ... | - |
| FUNCTION 3 | CONVERSION DESTINATION METRIC VALUE = t1 * $e^{t2(\text{CONVERSION SOURCE METRIC VALUE})}$ | 0.393 | 0.1845 | ... | - |
| ⋮ | ⋮ | ⋮ | ⋮ | ⋮ | ⋮ |

FIG. 9

COMPUTER, BOTTLENECK IDENTIFICATION METHOD, AND NON-TRANSITORY COMPUTER READABLE STORAGE MEDIUM

CLAIM OF PRIORITY

The present application claims priority from Japanese patent application JP 2017-218981 filed on Nov. 14, 2017, the content of which is hereby incorporated by reference into this application.

BACKGROUND OF THE INVENTION

This invention relates to a computer, method, and non-transitory computer readable storage medium for identifying a bottleneck of a system to be monitored.

In a computer system, for example, a data center, a virtualization technology and other technologies are used to construct a system for implementing a predetermined service. In such a computer system, there are a large number of resources to be monitored and metrics to be measured from those resources, resulting in an extreme difficulty in identifying the bottleneck.

As a technology for solving the above-mentioned problem, there is known a technology described in JP 2011-146074 A. In JP 2011-146074 A, there is a description of "an operation management apparatus including: a correlation model generation module configured to generate, based on time-series performance information indicating a chronological change in performance information, a correlation model including a plurality of correlation functions between pieces of performance information and weight information indicating prediction errors of those respective correlation functions; and a model search module configured to predict, when there are a plurality of paths, which are each a correlation function that may predict second performance information based on first performance information among the pieces of performance information or a combination of correlation functions, within the correlation model, the second performance information by using a path whose value of weight information is the maximum."

SUMMARY OF THE INVENTION

It is possible to identify the bottleneck while reducing a burden on an administrator by using JP 2011-146074 A. However, in a case where there are a large number of resources and metrics, that is, in a case where there are a large number of factors to be analyzed, there is a problem in that an extremely large amount of time is required to identify the bottleneck.

This invention has an object to provide a system and a method capable of quickly identifying a bottleneck.

The present invention can be appreciated by the description which follows in conjunction with the following figures, wherein: a computer, which is configured to manage a resource for which a metric being an indicator for evaluating performance of the resource is to be measured, comprises a processor, a storage apparatus coupled to the processor, and an interface coupled to the processor. The computer is coupled to, via the interface, a management target system including a plurality of resources. The storage apparatus stores correlation information for managing a correlation coefficient indicating a degree of correlation between metrics. The computer being configured to: detect a trigger event to identify a bottleneck based on a metric value of a monitored metric of a monitored resource; identify at least one related resource having a coupling relationship with the monitored resource; identify at least one correlation metric that is highly correlated with the monitored metric from among metrics of the at least one related resource based on the correlation information; identify a combination of the at least one related resource and the at least one correlation metric as a bottleneck candidate; and generate notification information for notifying of the bottleneck candidate, and output the notification information.

According to one embodiment of this invention, the computer can quickly identify the bottleneck (bottleneck candidate). Problems, configurations, and effects other than described above will become apparent from a description of an embodiment below.

BRIEF DESCRIPTION OF THE DRAWINGS

The present invention can be appreciated by the description which follows in conjunction with the following figures, wherein:

FIG. 8 is a table for showing an example of a data structure of metric conversion information in the first embodiment;

FIG. 9 is a table for showing an example of a data structure of conversion function information in the first embodiment;

DETAILED DESCRIPTION OF THE PREFERRED EMBODIMENTS

Figure 1:
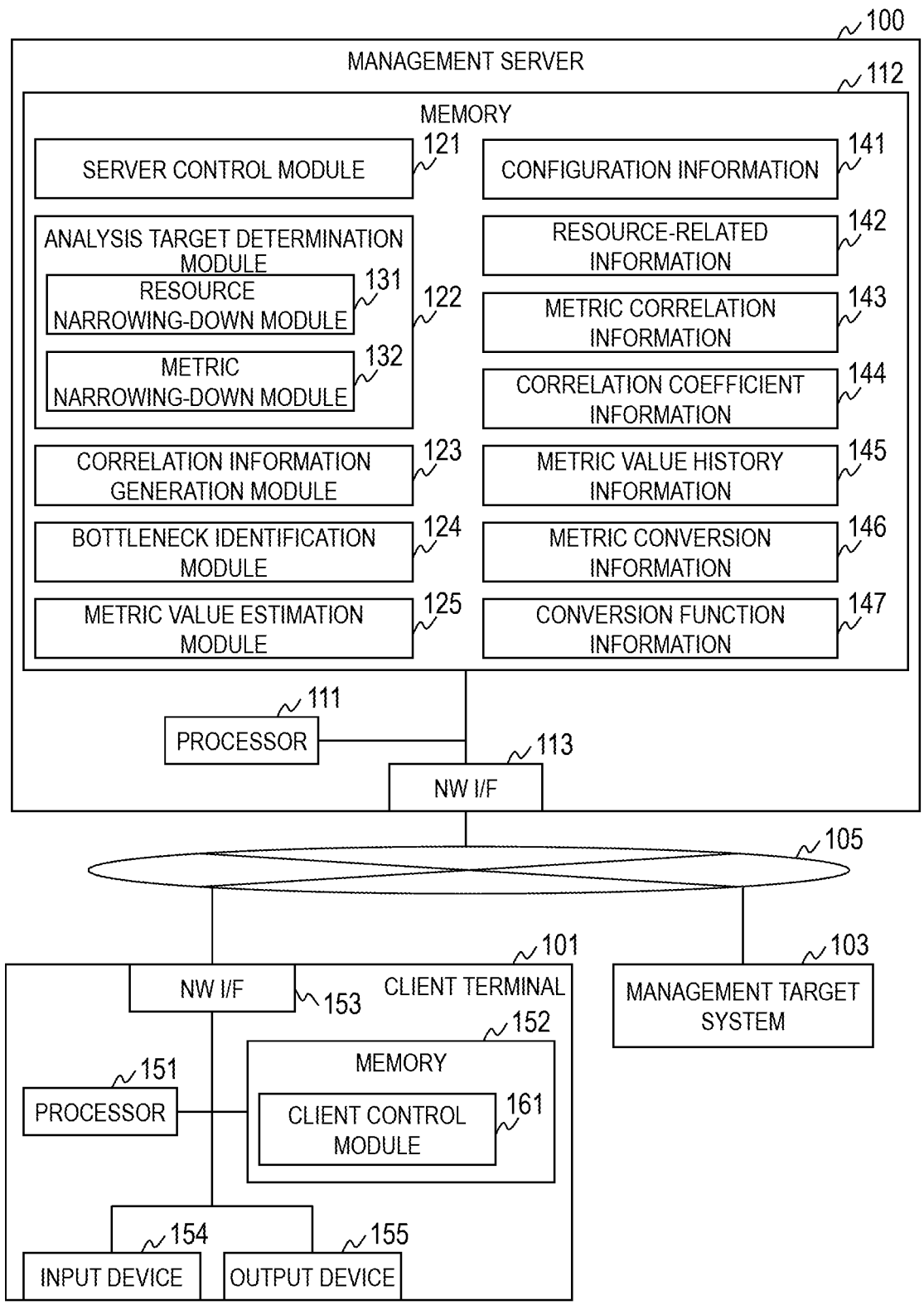
FIG. 1 is a diagram for illustrating an exemplary configuration of a computer system in a first embodiment.

Now, a description is given of an embodiment of this invention referring to the drawings. It should be noted that this invention is not to be construed by limiting the invention to the content described in the following embodiment. A person skilled in the art would easily recognize that a specific configuration described in the following embodiment may be changed within the scope of the concept and the gist of this invention.

In a configuration of this invention described below, the same or similar components or functions are assigned with the same reference numerals, and a redundant description thereof is omitted here.

Notations of, for example, "first", "second", and "third" herein are assigned to distinguish between components, and do not necessarily limit the number or order of those components.

The position, size, shape, range, and others of each component illustrated in, for example, the drawings may not represent the actual position, size, shape, range, and other metrics in order to facilitate understanding of this invention. Thus, this invention is not limited to the position, size, shape, range, and others described in, for example, the drawings.

First Embodiment

Figure 2:
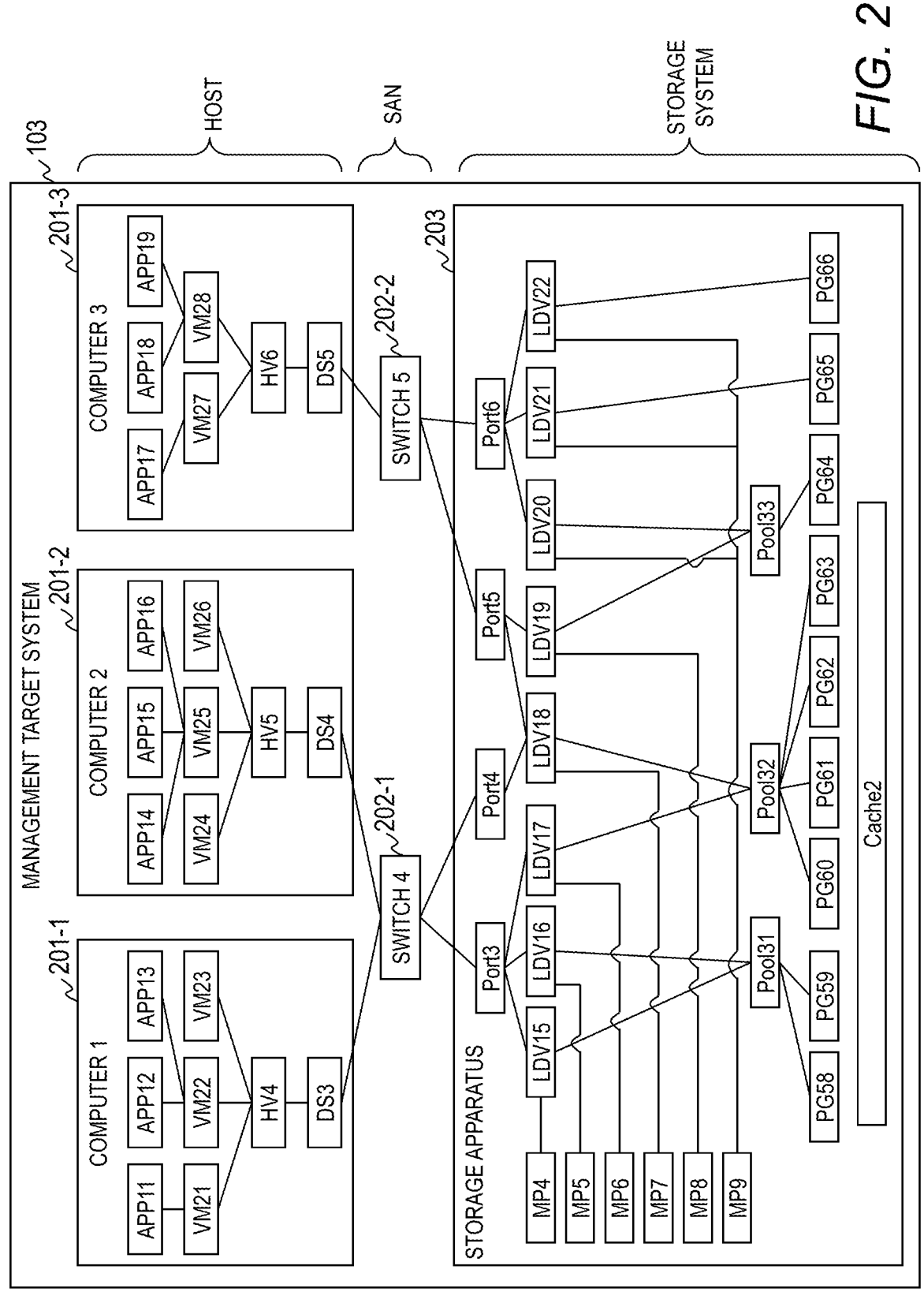
FIG. 2 is a diagram for illustrating an exemplary configuration of a business operation system constructed in a management target system in the first embodiment.

FIG. 1 is a diagram for illustrating an exemplary configuration of a computer system in a first embodiment of the present invention. FIG. 2 is a diagram for illustrating an exemplary configuration of a business operation system constructed in a management target system 103 in the first embodiment.

The computer system includes a management server 100, a client terminal 101, and a management target system 103. The management server 100, the client terminal 101, and the management target system 103 are coupled to one another via a network 105. The network 105 is, for example, a local area network (LAN) or a wide area network (WAN). The coupling may be implemented in a wired or wireless manner.

The management target system 103 is a system including a plurality of apparatus. A business operation system for implementing a predetermined service is constructed on the management target system 103. The business operation system includes a physical and virtual group of resources.

As illustrated in FIG. 2, the management target system 103 in the first embodiment includes three computers 201-1, 201-2, and 201-3, two switches 202-1 and 202-2, and a storage apparatus 203. A business operation system including a host computer, a storage system, and a storage area network (SAN) operates in the management target system 103.

The host computer includes, as resources, an application (APP), a virtual machine (VM), a hypervisor (HV), and a data store (DS). The SAN includes the switch 202 as a resource. The storage system includes, as resources, a port, a logical device (LDEV), an MP blade (MP), a storage area pool (pool), a physical volume group (PG), and a cache.

A value of an indicator for evaluating the performance of a resource can be measured from the resource. In the following description, the indicator is referred to as a "metric". Further, the above-mentioned value of the indicator is referred to as a "metric value". The metric is, for example, a CPU usage, a memory usage, a response time, and delay of communication.

In the first embodiment, a combination of a resource and a metric is identified as a bottleneck. The resource to be identified as a bottleneck does not include an application.

The management server 100 is configured to manage the management target system 103, and identify a bottleneck in a case where, for example, a failure has occurred or performance has deteriorated. Management of the management target system 103 includes, for example, construction of a system, change of a system configuration, and monitoring of the system.

The client terminal 101 is a terminal to be used by a user who operates the management server 100. When the user can directly operate the management server 100, the computer system may not include the client terminal 101.

Now, a description is given of a hardware configuration and software configuration of the management server 100.

The management server 100 includes a processor 111, a memory 112, and a network interface 113 in terms of hardware. Pieces of hardware are coupled to one another via, for example, an internal bus. The management server 100 may include a storage medium such as a hard disk drive (HDD) and a solid state drive (SSD).

The processor 111 is configured to execute a program stored in the memory 112. The processor 111 operates as a functional module (module) for implementing a specific function by executing processing in accordance with a program. In the following description, when processing is described with the functional module serving as a subject of a sentence, it means that the processor 111 is executing a program for implementing the functional module. The memory 112 stores a program to be executed by the processor 111 and information to be used by the program. Further, the memory 112 includes a work area to be used by the program. Details of the program and information stored in the memory 112 are described later.

The network interface 113 is an interface for coupling to another apparatus via a network.

Now, a description is given of the program and information stored in the memory 112. The memory 112 stores programs for implementing a server control module 121, an analysis target determination module 122, a correlation information generation module 123, a bottleneck identification module 124, and a metric value estimation module 125. Further, the memory 112 stores configuration information 141, resource-related information 142, metric correlation information 143, correlation coefficient information 144, metric value history information 145, metric conversion information 146, and conversion function information 147.

The configuration information 141 is information for managing resources included in a business operation system. Details of the configuration information 141 are described with reference to FIG. 3. The resource-related information 142 is information for managing relevance among resources. Details of the resource-related information 142 are described with reference to FIG. 4.

The metric correlation information 143 is information for managing correlation among metrics of resources. The correlation coefficient information 144 is information for managing a correlation coefficient indicating a degree of the correlation defined in the metric correlation information 143. Details of the metric correlation information 143 and the correlation coefficient information 144 are described with reference to FIG. 5 and FIG. 6.

The metric value history information 145 is information for managing a history of a measured metric value. Details of the metric value history information 145 are described with reference to FIG. 7.

The metric conversion information 146 is information for managing a method of converting a metric value of one resource into a metric value of another resource. The conversion function information 147 is information for managing a conversion function that converts a metric value. Details of the metric conversion information 146 and the conversion function information 147 are described with reference to FIG. 8 and FIG. 9.

The server control module 121 is configured to control the entire management server 100. The analysis target determination module 122 is configured to determine a combination of a resource to be analyzed and a metric. The analysis target determination module 122 includes a resource narrowing-down module 131 and a metric narrowing-down module 132. The correlation information generation module 123 is configured to generate and update the metric correlation information 143 and the correlation coefficient information 144. The bottleneck identification module 124 is configured to perform analysis and identify a bottleneck based on a result of analysis. The metric value estimation module 125 is configured to calculate an estimation value (estimated metric value) of a metric value.

Details of processing to be executed by the analysis target determination module 122, the correlation information generation module 123, the bottleneck identification module 124, and the metric value estimation module 125 are described later.

This concludes the description of the hardware configuration and software configuration of the management server 100. Next, a description is given of a hardware configuration and software configuration of the client terminal 101.

The client terminal 101 includes a processor 151, a memory 152, a network interface 153, an input device 154, and an output device 155 in terms of hardware. Pieces of hardware are coupled to one another via, for example, an internal bus.

The processor 151, the memory 152, and the network interface 153 are hardware components similar to the processor 111, the memory 112, and the network interface 113. The input device 154 is a device for receiving input of data. The input device 154 is, for example, a keyboard, a mouse, or a touch panel. The output device 155 is a device for outputting data. The output device 155 is, for example, a touch panel or a display. The network interface 113 may be used as the output device 155.

The memory 152 stores a client control module 161 configured to control the entire client terminal 101.

Regarding the functional modules of each of the management server 100 and the client terminal 101, a plurality of functional modules may be integrated into one functional module, or one functional module may be divided into a plurality of functional modules.

Figure 3:
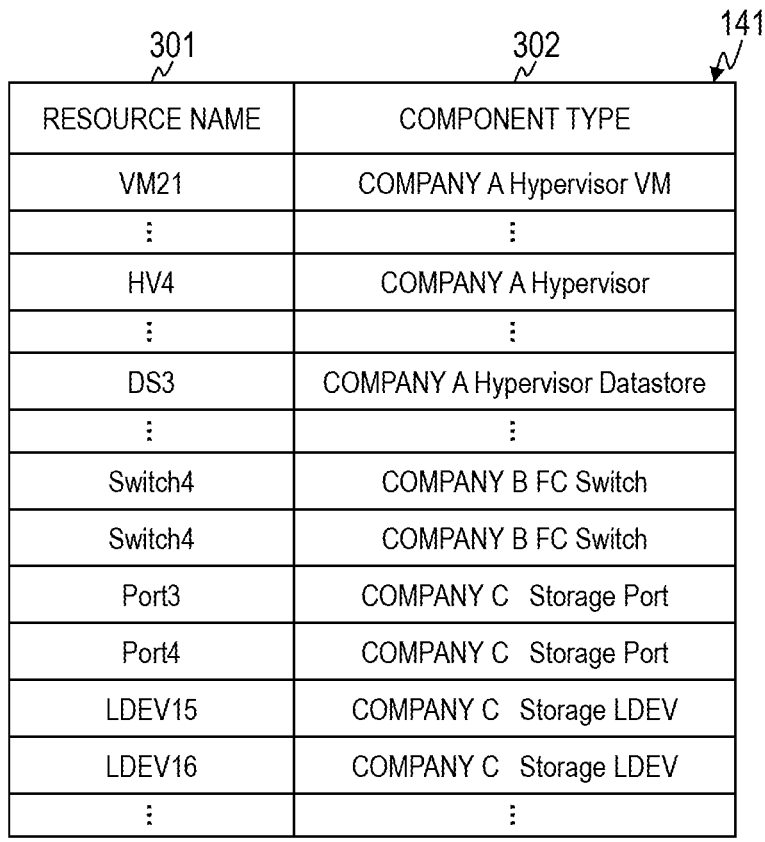
FIG. 3 is a table for showing an example of a data structure of configuration information in the first embodiment.

FIG. 3 is a table for showing an example of a data structure of the configuration information 141 in the first embodiment.

The configuration information 141 includes an entry formed of a resource name 301 and a component type 302. One entry corresponds to one resource included in the business operation system.

The resource name 301 is a field that stores an identification name for uniquely identifying a resource included in the business operation system. The component type 302 is a field that stores information for identifying the type of a resource such as a hardware resource or a software resource that implements the resource.

In the first embodiment, the management server 100 is configured to periodically measure metrics of a plurality of resources that are managed by using the configuration information 141. The measured metric values are stored into the metric value history information 145.

Figure 4:
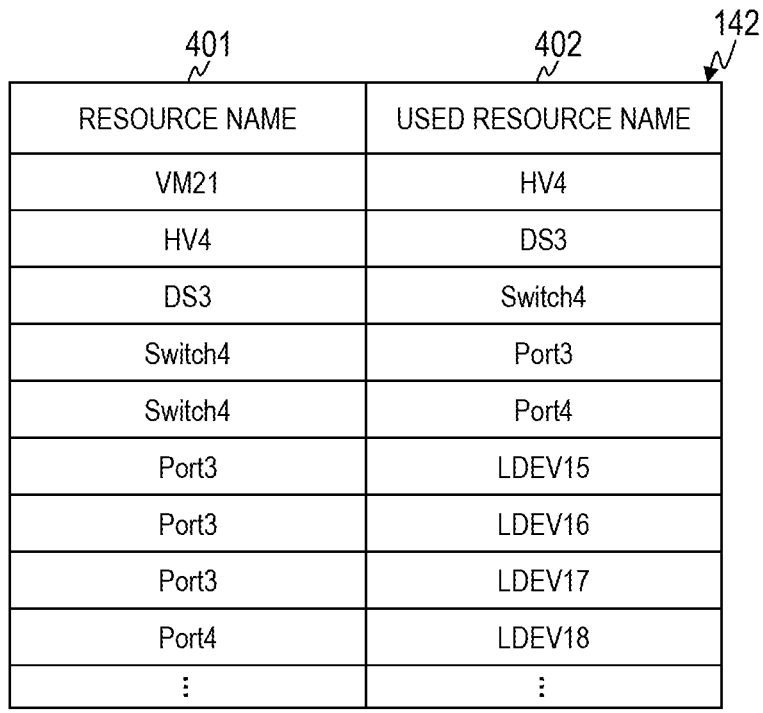
FIG. 4 is a table for showing an example of a data structure of resource-related information in the first embodiment.

FIG. 4 is a table for showing an example of a data structure of the resource-related information 142 in the first embodiment.

The resource-related information 142 includes an entry formed of a resource name 401 and a used resource name 402. There is one entry for one combination of a resource and a used resource.

The resource name 401 is the same field as the resource name 301. The used resource name 402 is a field that stores an identification name of a resource that is associated with a resource corresponding to the resource name 401.

In the first embodiment, a relevance (coupling relationship) between resources is defined in a tree structure in which the virtual machine is at the top layer and a physical volume or a cache is at the bottom layer.

Figure 5:
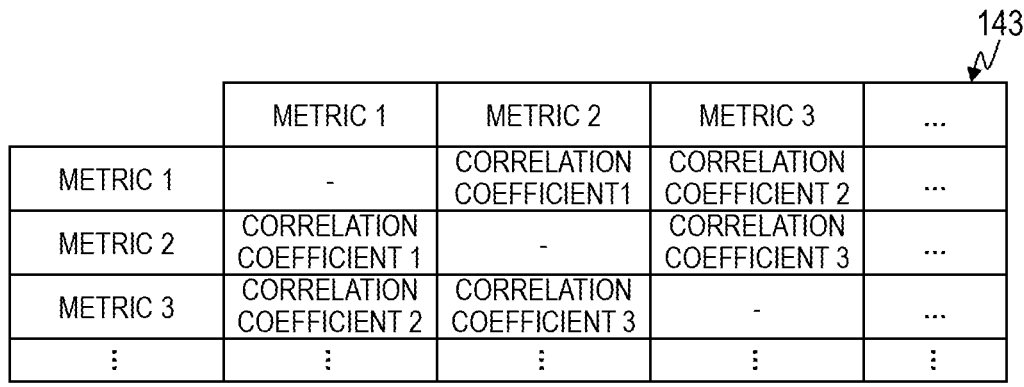
FIG. 5 is a table for showing an example of a data structure of metric correlation information in the first embodiment.
Figure 6:
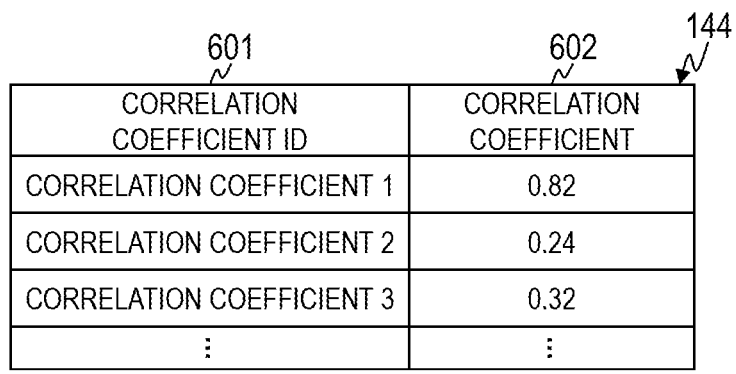
FIG. 6 is a table for showing an example of a data structure of correlation coefficient information in the first embodiment.

FIG. 5 is a table for showing an example of a data structure of the metric correlation information 143 in the first embodiment. FIG. 6 is a table for showing an example of a data structure of the correlation coefficient information 144 in the first embodiment.

The metric correlation information 143 is information having a data structure of a matrix format. There is one piece of metric correlation information 143 for one combination of resources. A row and a column correspond to metrics of respective resources.

In a case where metrics are correlated to each other, a cell identified by a combination of those metrics stores identification information for reading out a correlation coefficient from the correlation coefficient information 144. The correlation coefficient is controlled not to be set in a cell of the same metric.

There is one piece of correlation coefficient information 144 for one combination of resources. The correlation coefficient information 144 includes an entry formed of a correlation coefficient ID 601 and a correlation coefficient 602. One entry corresponds to one correction coefficient.

The correlation coefficient ID 601 is a field that stores identification information on a correlation coefficient. The correlation coefficient 602 is a field that stores a correlation coefficient indicating a degree of correlation between metrics. The correlation coefficient is a real number equal to or larger than "−1" and equal to or smaller than "1". As the absolute value of the correlation coefficient becomes closer to 1, the correlation between metrics is indicated to be larger.

The management server 100 in the first embodiment holds the metric correlation information 143 and the correlation coefficient information 144 to manage correlation between metrics, but may hold only the metric correlation information 143 in which a correlation coefficient is set in a cell.

Figure 7:
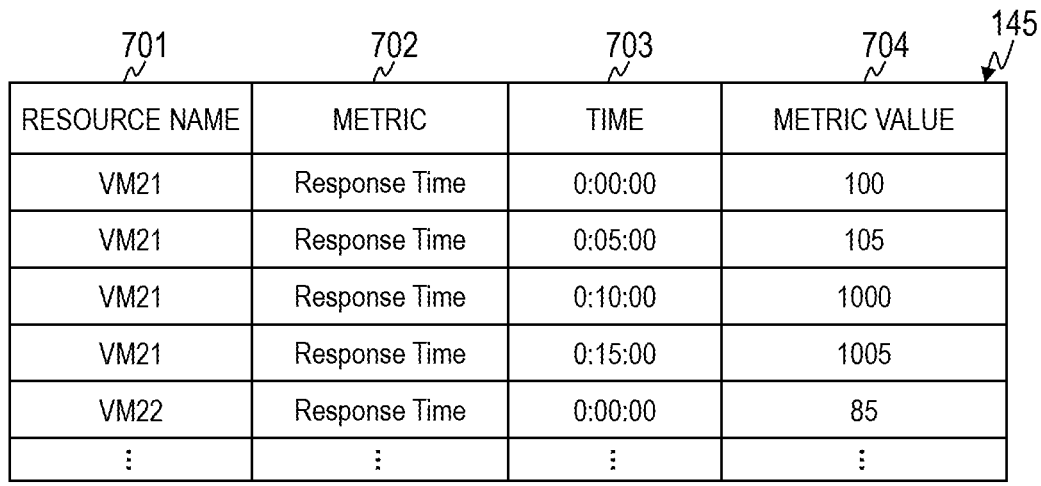
FIG. 7 is a table for showing an example of a data structure of metric value history information in the first embodiment.

FIG. 7 is a table for showing an example of a data structure of the metric value history information 145 in the first embodiment.

The metric value history information 145 includes an entry formed of a resource name 701, a metric 702, a time 703, and a metric value 704.

The resource name 701 is the same field as the resource name 301. The metric 702 is a field that stores identification information on a metric that can be obtained from a resource corresponding to the resource name 701. The time 703 is a field that stores a measurement time. The metric value 704 is a field that stores the measured metric value.

FIG. 8 is a table for showing an example of a data structure of the metric conversion information 146 in the first embodiment. FIG. 9 is a table for showing an example of a data structure of the conversion function information 147 in the first embodiment.

The metric conversion information 146 includes an entry formed of a conversion source 801, a conversion destination 802, and a function ID 803. One entry corresponds to definition information on one conversion method.

The conversion source 801 is a group of fields for specifying the metric of a conversion source, and includes a resource name 811 and a metric 812. The conversion destination 802 is a group of fields for specifying the metric of a conversion destination, and includes a resource name 821 and a metric 822. The function ID 803 is a field that stores identification information on a conversion function. The conversion function is a function for calculating a metric value specified by the conversion destination 802 from a metric value specified by the conversion source 801.

The conversion function information 147 includes an entry formed of a function ID 901, a function 902, and a parameter 903. One entry corresponds to one conversion function.

The function ID 901 is the same field as the function ID 803. The function 902 is a field that stores a conversion function. The parameter 903 is a field that stores the value of a parameter set in the conversion function. Conversion functions can be managed easily by managing a function including parameters and those parameters separately from each other.

The management server 100 in the first embodiment holds the metric conversion information 146 and the conversion function information 147 in order to manage the conversion function, but may hold only the metric conversion information 146 including a field that stores a conversion function having set parameter values instead of the function ID 803.

Next, a description is given of processing to be executed by the management server 100 to identify a bottleneck candidate with reference to FIG. 10 to FIG. 14.

Figure 10:
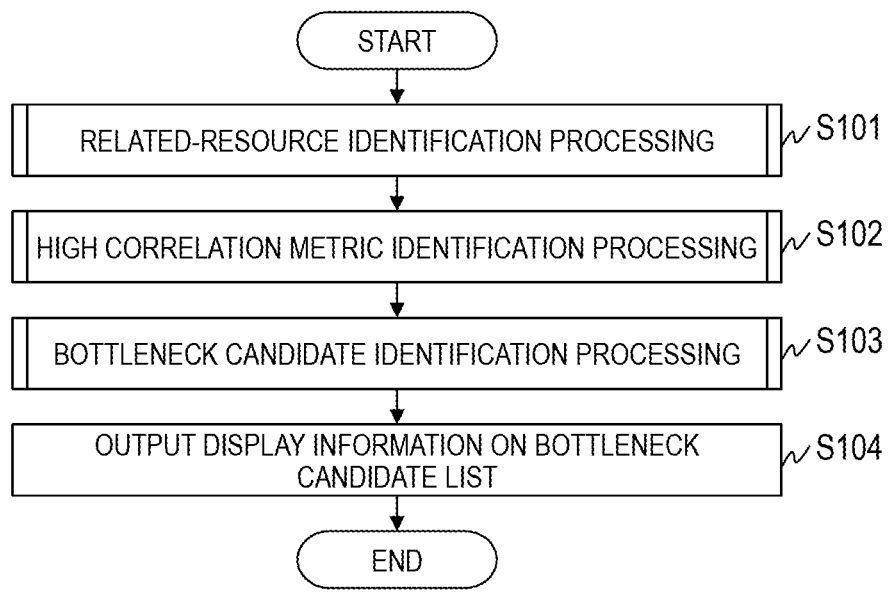
FIG. 10 is a flowchart for illustrating an outline of processing to be executed in a case where a management server in the first embodiment has detected a trigger event to identify a bottleneck.

FIG. 10 is a flowchart for illustrating an outline of processing to be executed in a case where the management server 100 in the first embodiment has detected a trigger event to identify a bottleneck.

In the first embodiment, it is assumed that a combination of a resource and a metric, which are monitored to detect a trigger event to execute processing described below, is set in advance. In the following description, the resource and the metric, which are monitored to detect a trigger event to execute to the processing, are referred to as "monitored resource" and "monitored metric", respectively.

It should be noted that this invention is not limited to the trigger event to identify a bottleneck. For example, the management server 100 compares the metric value and threshold value of any resource, and determines whether performance deterioration has occurred based on the result of comparison. In a case where it is determined that performance deterioration has occurred, the management server 100 starts processing described below. The management server 100 may start the processing in a case where a notification of occurrence of performance deterioration is received from the outside.

First, the server control module 121 of the management server 100 calls and instructs the analysis target determination module 122 to execute related-resource identification processing for identifying a related resource of a monitored resource (Step S101). This processing can be executed to reduce the number of resources to be analyzed. Details of the related-resource identification processing are described with reference to FIG. 11. In this case, the related resource represents a resource to which a resource serving as a start point can be coupled directly or via other resources.

Next, the server control module 121 of the management server 100 calls and instructs the analysis target determination module 122 to execute high correlation metric identification processing for identifying a metric (high correlation metric) that is highly correlated with the monitored resource from among metrics of the related resource (Step S102). This processing can be executed to reduce the number of metrics to be analyzed. Details of the high correlation metric identification processing are described with reference to FIG. 12.

Next, the server control module 121 of the management server 100 calls and instructs the bottleneck identification module 124 to execute bottleneck candidate identification processing (Step S103). This processing is executed to generate a bottleneck candidate list. Details of the bottleneck candidate identification processing are described with reference to FIG. 13.

Next, the bottleneck identification module 124 of the management server 100 generates display information for presenting the bottleneck candidate list, outputs the display information (Step S104), and then ends the processing. For example, the management server 100 transmits the display information to the client terminal 101.

Figure 11:
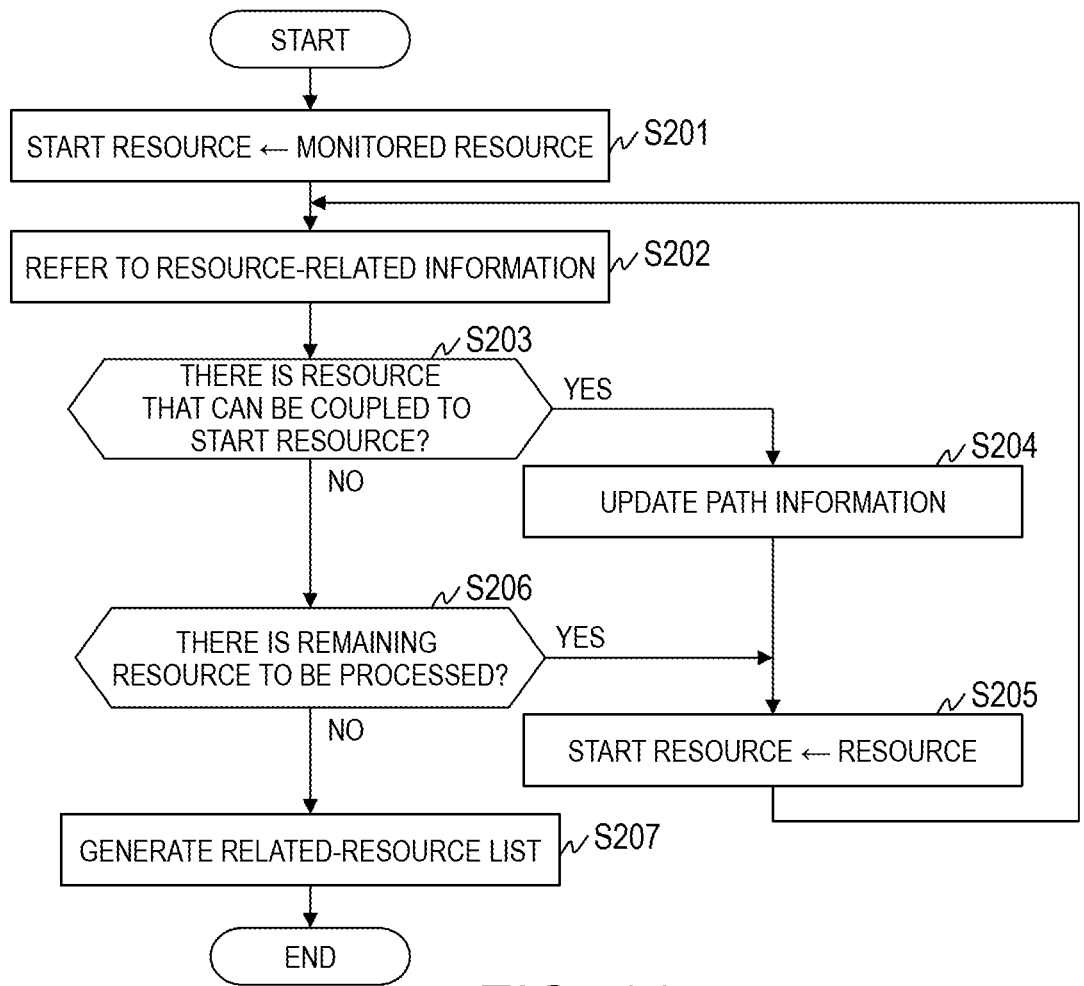
FIG. 11 is a flowchart for illustrating related-resource identification processing to be executed by the management server in the first embodiment.

FIG. 11 is a flowchart for illustrating the related-resource identification processing to be executed by the management server 100 in the first embodiment.

The resource narrowing-down module 131 of the analysis target determination module 122 sets the monitored resource as the start resource (Step S201).

Specifically, the resource narrowing-down module 131 sets a variable representing the start resource to an identification name of the monitored resource. Further, the resource narrowing-down module 131 initializes path information and a related-resource list.

Next, the resource narrowing-down module 131 refers to the resource-related information 142 (Step S202) to determine whether there is a resource that can be coupled to the start resource (Step S203).

Specifically, the resource narrowing-down module 131 searches for an entry in which the identification name of the resource set as the start resource is set in the resource name 401. In a case where there is such an entry, the resource narrowing-down module 131 determines that there is a resource that can be coupled to the start resource.

In a case where it is determined that there is a resource that can be coupled to the start resource, the resource narrowing-down module 131 updates the path information by registering the retrieved entry in the path information (Step S204). At this time, the resource narrowing-down module 131 registers the resource that can be coupled to the start resource in a list of remaining related resources to be processed.

Next, the resource narrowing-down module 131 sets a remaining related resource to be processed as a next start resource (Step S205). After that, the resource narrowing-down module 131 returns to Step S202, and executes similar processing. At this time, the resource narrowing-down module 131 deletes an identification name of the next start resource from the list of remaining related resources to be processed.

In a case where it is determined that there is no resource that can be coupled to the start resource, the resource narrowing-down module 131 determines whether there is a remaining related resource to be processed (Step S206).

In a case where it is determined that there is a remaining related resource to be processed, the resource narrowing-down module 131 advances to Step S205.

In a case where it is determined that there is no remaining related resource to be processed, the resource narrowing-down module 131 generates the related-resource list by using the path information (Step S207).

Specifically, the resource narrowing-down module 131 reads out the value of the used resource name 402 of an entry registered in the path information, and registers the value in the related-resource list. At this time, the resource narrowing-down module 131 performs control so that a duplicate value is not registered in the related-resource list. The resource narrowing-down module 131 outputs the generated related-resource list to the metric narrowing-down module 132.

Figure 12:
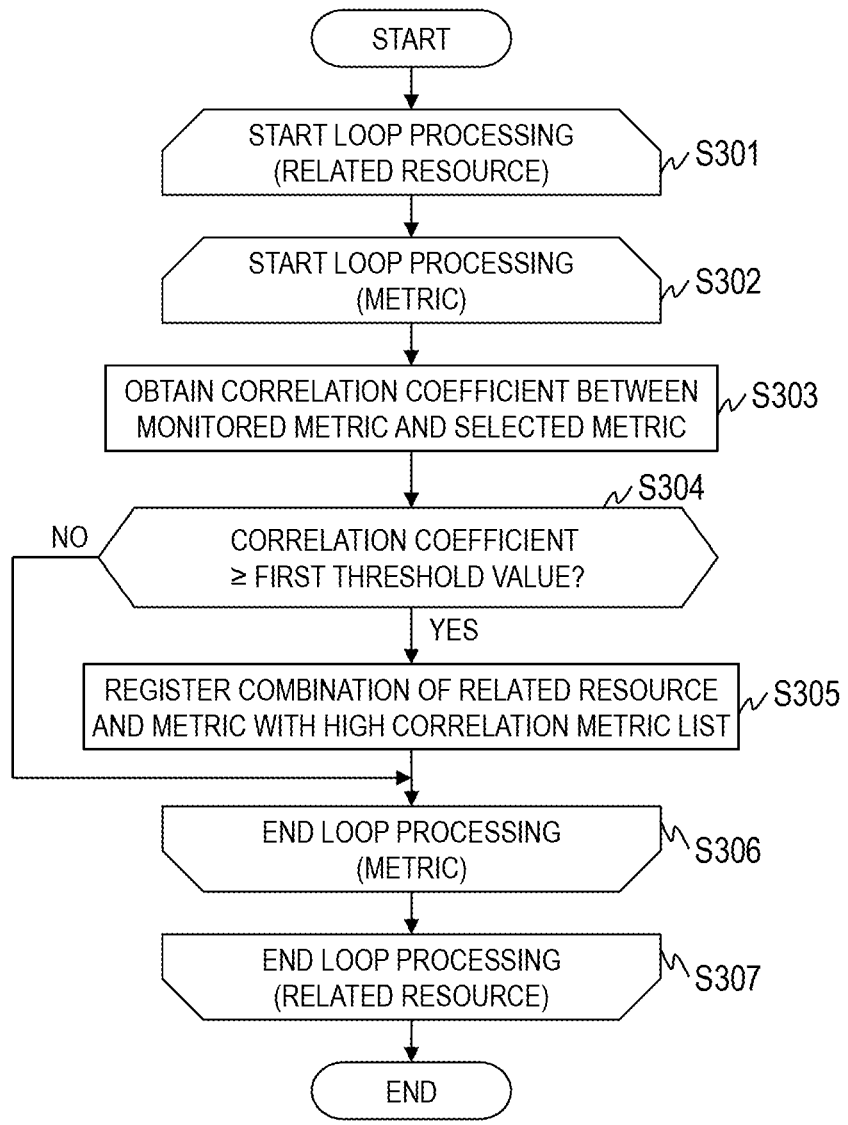
FIG. 12 is a flowchart for illustrating high correlation metric identification processing to be executed by the management server in the first embodiment.

FIG. 12 is a flowchart for illustrating the high correlation metric identification processing to be executed by the management server 100 in the first embodiment.

The metric narrowing-down module 132 of the analysis target determination module 122 starts loop processing for a related resource (Step S301).

Specifically, the metric narrowing-down module 132 selects one related resource from among related resources registered in the related-resource list.

At this time, the metric narrowing-down module 132 initializes a high correlation metric list.

Next, the metric narrowing-down module 132 starts loop processing for a metric of the related resource (Step S302).

Specifically, the metric narrowing-down module 132 selects one metric from among metrics that can be obtained from the related resource. In the following description, the metric selected by the metric narrowing-down module 132 is referred to as a "selected metric".

Next, the metric narrowing-down module 132 refers to the metric correlation information 143 and the correlation coefficient information 144 corresponding to a combination of the monitored resource and the related resource to obtain a correlation coefficient for correlation between the monitored metric and the selected metric (Step S303).

Specifically, the metric narrowing-down module 132 refers to the metric correlation information 143 corresponding to a combination of the monitored resource and the related resource to obtain identification information on a correlation coefficient set in a cell corresponding to a combination of the monitored metric and the selected metric. Further, the metric narrowing-down module 132 refers to the correlation coefficient information 144 corresponding to a combination of the monitored metric and the related resource, searches for an entry in which the correlation coefficient ID 601 matches the identification information on the obtained correlation coefficient, and obtains a correlation coefficient stored in the correlation coefficient 602 of the retrieved entry.

Next, the metric narrowing-down module 132 determines whether the correlation coefficient is equal to or larger than a first threshold value (Step S304). It is assumed that the first threshold value is set in advance. The first threshold value can be changed appropriately.

In a case where it is determined that the correlation coefficient is smaller than the first threshold value, the metric narrowing-down module 132 advances to Step S306.

In a case where it is determined that the correlation coefficient is equal to or larger than the first threshold value, the metric narrowing-down module 132 registers an entry formed of the related resource, the selected metric, and the correlation coefficient in the high correlation metric list (Step S305). After that, the metric narrowing-down module 132 advances to Step S306.

In Step S306, the metric narrowing-down module 132 determines whether the processing is complete for all the metrics of the selected related resource (Step S306).

In a case where it is determined that processing is not complete for all the metrics of the selected related resource, the metric narrowing-down module 132 returns to Step S302, and selects a next metric to execute similar processing.

In a case where it is determined that the processing is complete for all the metrics of the selected related resource, the metric narrowing-down module 132 determines whether the processing is complete for all the related resources registered in the related-resource list (Step S307).

In a case where it is determined that processing is not complete for all the related resources registered in the related-resource list, the metric narrowing-down module 132 returns to Step S301, and selects a next related resource from the related-resource list to execute similar processing.

In a case where it is determined that the processing is complete for all the related resources registered in the related-resource list, the metric narrowing-down module 132 ends the processing. At this time, the metric narrowing-down module 132 outputs the high correlation metric list to the bottleneck identification module 124.

Figure 13:
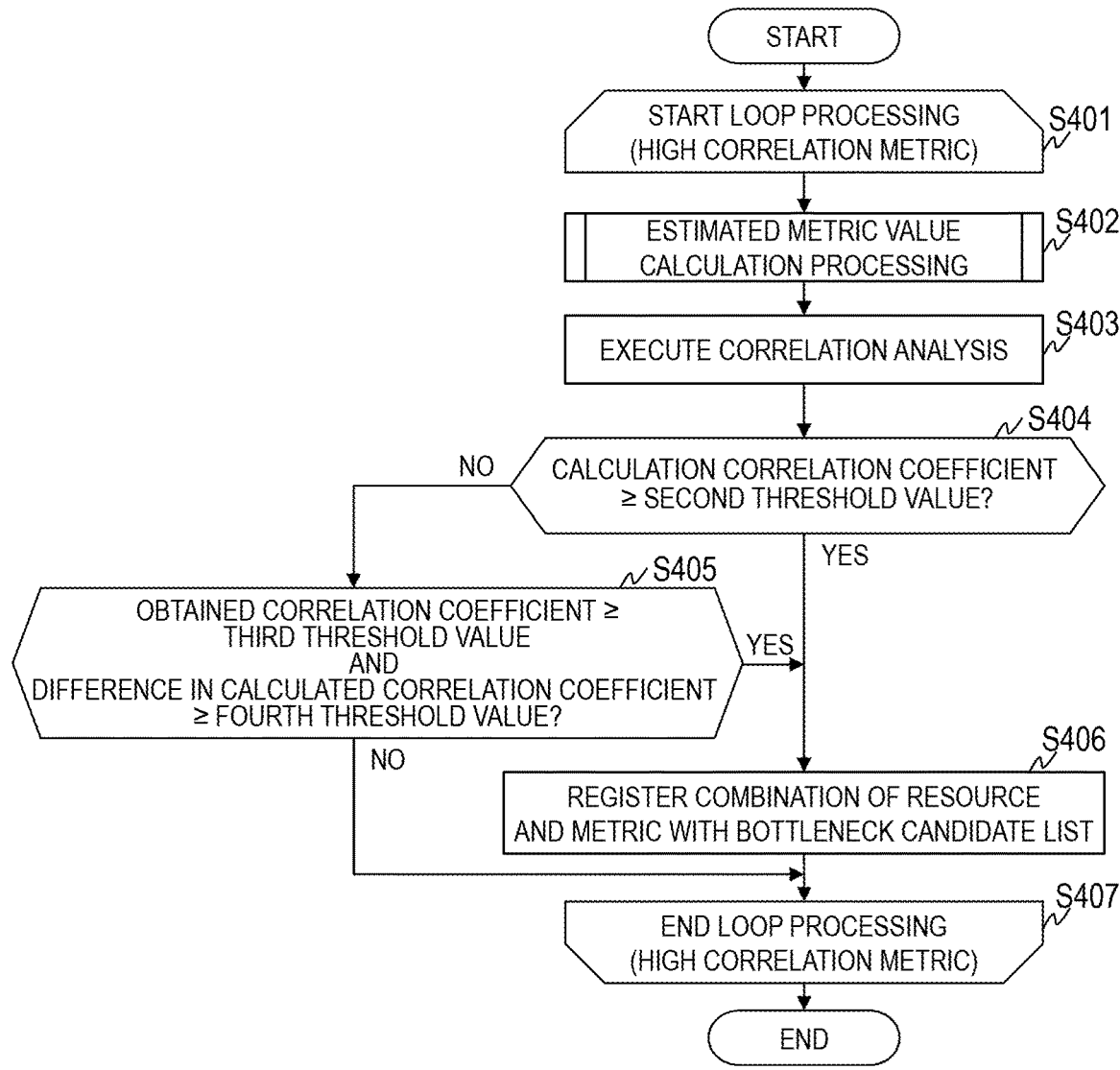
FIG. 13 is a flowchart for illustrating bottleneck candidate identification processing to be executed by the management server in the first embodiment.

FIG. 13 is a flowchart for illustrating the bottleneck candidate identification processing to be executed by the management server 100 in the first embodiment.

The bottleneck identification module 124 of the management server 100 starts loop processing for a high correlation metric (Step S401).

Specifically, the bottleneck identification module 124 selects one combination of the resource and the metric from the high correlation metric list. At this time, the bottleneck identification module 124 initializes the bottleneck candidate list. In the following description, the resource and the metric selected by the bottleneck identification module 124 are referred to as a "target resource" and a "target metric", respectively.

Next, the bottleneck identification module 124 instructs the metric value estimation module 125 to execute estimated metric value calculation processing (Step S402). Details of the estimated metric value calculation processing are described with reference to FIG. 14. In the estimated metric value calculation processing, time-series data on the estimated metric value of the monitored metric is calculated.

The bottleneck identification module 124 is in a standby state until the time-series data on the estimated metric value of the monitored metric is output from the metric value estimation module 125.

In a case where the estimated metric value of the monitored metric is output from the metric value estimation module 125, the bottleneck identification module 124 executes correlation analysis processing (Step S403).

Specifically, the bottleneck identification module 124 obtains the time-series data on the metric value of the monitored metric from the metric value history information 145. The bottleneck identification module 124 uses the time-series data on the metric value of the monitored metric and the time-series data on the estimated metric value of the monitored metric to calculate a correlation coefficient for correlation between those two metrics. Further, the bottleneck identification module 124 refers to the metric correlation information 143 and the correlation coefficient information 144 to obtain a correlation coefficient for correlation between the target metric and the monitored metric, and calculates an error between the calculated correlation coefficient and the obtained correlation coefficient.

The correlation coefficient is used as an indicator for evaluating the degree of correlation between the high correlation metric and the monitored metric at a time when performance deterioration has occurred. The error between correlation coefficients is used as an indicator for evaluating an abnormality of the correlation at a time when performance deterioration has occurred, for example.

In a case where the high correlation metric and the monitored metric are highly correlated to each other, the high correlation metric is highly likely to influence the monitored metric. In other words, the high correlation metric of the related resource is highly likely to be a bottleneck. Further, in a case where the error between correlation coefficients is large, it indicates that the correlation is destroyed due to, for example, performance deterioration, and thus the high correlation metric is highly likely to influence the monitored metric. In other words, the high correlation metric of the related resource is highly likely to be a bottleneck.

The bottleneck identification module 124 determines whether the calculated correlation coefficient is equal to or larger than the second threshold value (Step S404).

In a case where it is determined that the calculated correlation coefficient is smaller than the second threshold value, the bottleneck identification module 124 determines whether the obtained correlation coefficient is equal to or larger than a third threshold value and the error between calculated correlation coefficients is equal to or larger than a fourth threshold value (Step S405).

In a case where it is determined that the condition of Step S405 is not satisfied, the bottleneck identification module 124 advances to Step S407.

In a case where it is determined that the condition of Step S405 is satisfied, the bottleneck identification module 124 advances to Step S406.

In Step S404, in a case where it is determined that the calculated correlation coefficient is equal to or larger than the second threshold value, the bottleneck identification module 124 advances to Step S406.

In Step S406, the bottleneck identification module 124 registers a combination of the target resource and the target metric in the bottleneck candidate list as a bottleneck candidate (Step S406). After that, the bottleneck identification module 124 advances to Step S407.

Specifically, the bottleneck identification module 124 registers an entry formed of the target resource and the target metric in the bottleneck candidate list. An entry formed of the target resource, the target metric, and the calculated correlation coefficient may be registered in the bottleneck candidate list.

In Step S407, the bottleneck identification module 124 determines whether the processing is complete for all the combinations of the resource and the metric registered in the high correlation metric list.

In a case where it is determined that the processing is not complete for all the combinations of the resource and the metric registered in the high correlation metric list, the bottleneck identification module 124 returns to Step S401, and selects a next combination to execute similar processing.

In a case where it is determined that the processing is complete for all the combinations of the resource and the metric registered in the high correlation metric list, the bottleneck identification module 124 ends the processing.

It should be noted that the correlation analysis is an example of statistical analysis processing, and is not limited thereto. For example, in Step S403, the bottleneck identification module 124 calculates a sum of differences between pieces of the time-series data on the metric value of the monitored metric and pieces of the time-series data on the estimated metric value of the monitored metric, and determines whether the sum is equal to or larger than a threshold value in Step S404. In a case where the sum is smaller than the threshold value, the bottleneck identification module 124 advances to Step S406, whereas in a case where the sum is equal to or larger than the threshold value, the bottleneck identification module 124 advances to Step S407.

The bottleneck identification module 124 may output the high correlation metric list as the bottleneck candidate list without executing the processing of from Step S402 to Step S405. For example, in a case where the number of high correlation metrics registered in the high correlation metric list is smaller than a threshold value, such an operation as described above can be performed to present the bottleneck candidates quickly.

In Step S401, in a case where the bottleneck identification module 124 obtains the time-series data on the metric value of the target metric and the temporal change of the metric value is small, the bottleneck identification module 124 may advance to Step S407 without executing the processing of from Step S402 to Step S406 for the target metric. The temporal change of the metric value can be determined based on an indicator indicating the temporal change of the metric, for example, a moving average of the metric. In a case where the change in time-series data at the time of occurrence of a failure is small, the metric can be estimated to have nothing to do with the failure. Therefore, such an operation as described above can be performed to reduce the number of metrics to be analyzed, and thus it is possible to speed up the bottleneck identification processing.

Figure 14:
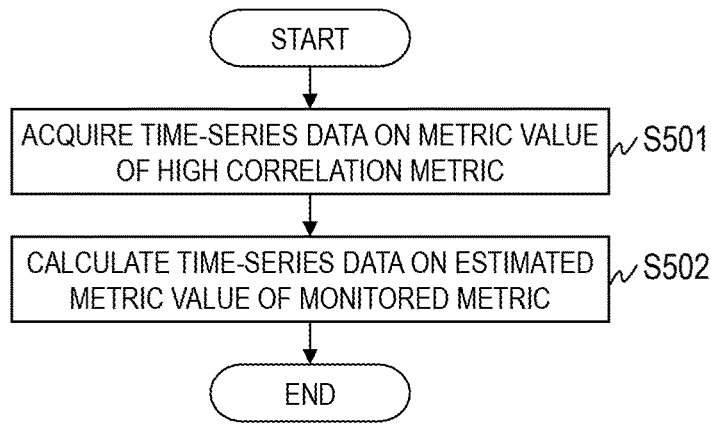
FIG. 14 is a flowchart for illustrating estimated metric value calculation processing to be executed by the management server in the first embodiment.

FIG. 14 is a flowchart for illustrating the estimated metric value calculation processing to be executed by the management server 100 in the first embodiment.

The metric value estimation module 125 of the management server 100 obtains time-series data on the metric value of a high correlation metric from the metric value history information 145 (Step S501).

Specifically, the metric value estimation module 125 searches for an entry in which a combination of the resource name 701 and the metric 702 matches a combination of the related resource and the selected metric. Further, the metric value estimation module 125 refers to the time 703 of the retrieved entry, and reads out the value of the metric value 704 when the time 703 of that entry is included in a predetermined time range. In other words, time-series data on the metric value is read out. The time range is set in advance.

Next, the metric value estimation module 125 uses the read time-series data on the metric value to calculate time-series data on the estimated metric value of the monitored metric (Step S502). After that, the metric value estimation module 125 ends the processing. Specifically, the following processing is executed.

The metric value estimation module 125 refers to the metric conversion information 146 to search for an entry in which a combination of the resource name 811 and the metric 812 of the conversion source 801 matches a combination of the target resource and the target metric, and a combination of the resource name 821 and the metric 822 of the conversion destination 802 matches a combination of the monitored resource and the monitored metric. The metric value estimation module 125 obtains identification information on the retrieved entry from the function ID 803 thereof.

The metric value estimation module 125 refers to the conversion function information 147 to search for an entry in which the function ID 901 matches the obtained identification information. The metric value estimation module 125 calculates time-series data on the estimated metric value of the monitored metric based on information on a conversion function stored in the retrieved entry and the time-series data on the metric value of the high correlation metric. This concludes the description of the processing of Step S502.

Figure 15:
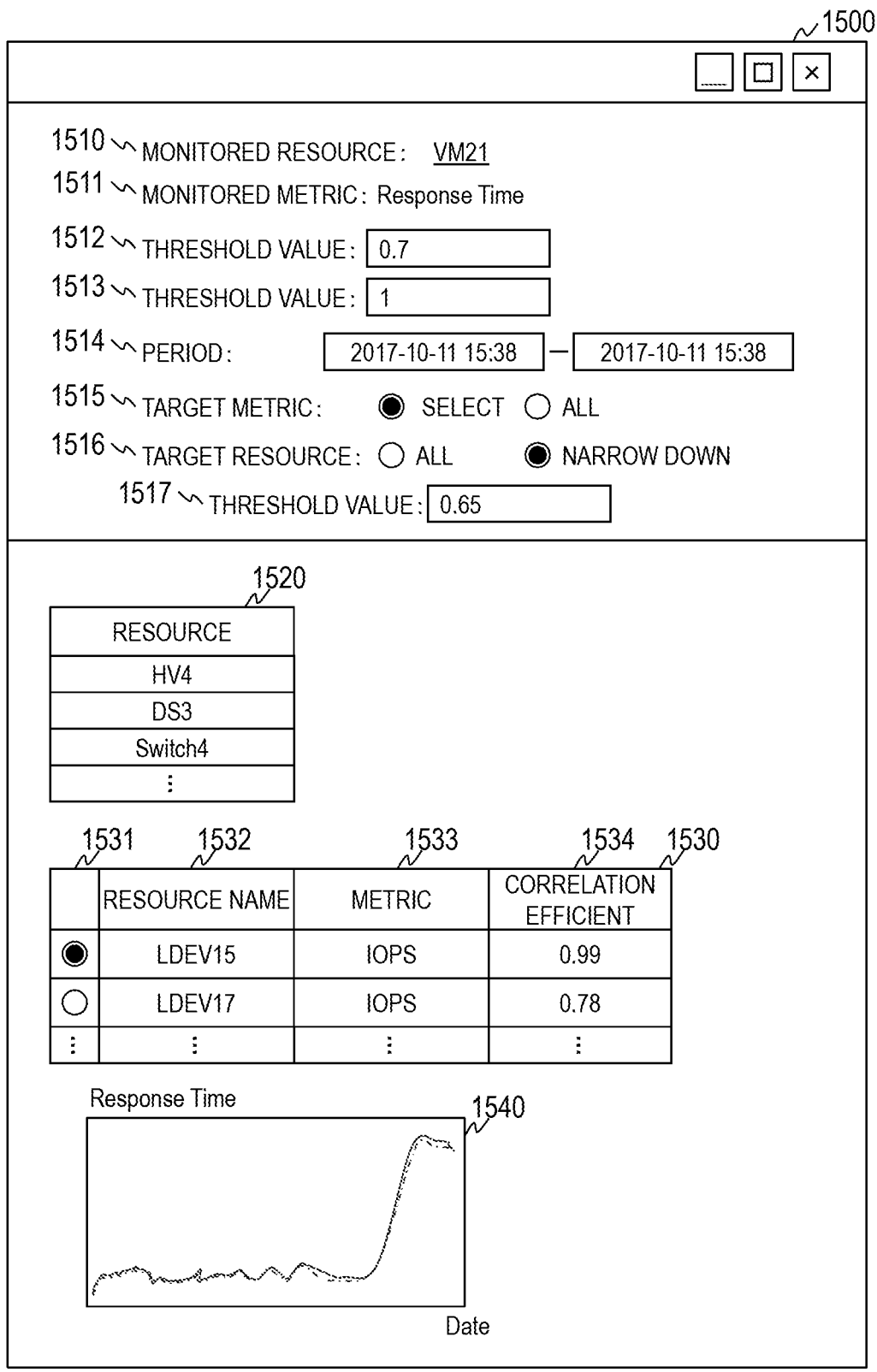
FIG. 15 is a diagram for illustrating an example of an operation screen to be displayed on a client terminal in the first embodiment.

FIG. 15 is a diagram for illustrating an example of an operation screen to be displayed on the client terminal 101 in the first embodiment.

An operation screen 1500 is a screen for setting information required to identify a bottleneck and for displaying the bottleneck candidate list. The operation screen 1500 includes a monitored resource display field 1510, a monitored metric display field 1511, threshold value setting fields 1512 and 1513, a period setting field 1514, a target metric selection field 1515, a target resource selection field 1516, a threshold value setting field 1517, a related-resource list display field 1520, a bottleneck candidate list display field 1530, and a graph display field 1540.

The monitored resource display field 1510 is a field for displaying a monitored resource. The monitored metric display field 1511 is a field for displaying a monitored metric.

The threshold value setting field 1512 is a field for setting the second threshold value. The threshold value setting field 1513 is a field for setting the third threshold value.

The period setting field 1514 is a field for setting a time width of the time-series data to be obtained at the time of calculation of the estimated metric value.

The target metric selection field 1515 and the target resource selection field 1516 are fields for specifying a metric and a resource for processing. The target metric selection field 1515 includes radio buttons for selecting whether all or a part of metrics identified as the high correlation metric are selected for processing. The target resource selection field 1516 includes radio buttons for selecting a related resource for processing in a case where the high correlation metric is identified.

The threshold value setting field 1517 is a field for setting the first threshold value. In the first embodiment, when a radio button of "narrow down" of the target resource selection field 1516 is operated, a value can be input to the threshold value setting field 1517.

The related-resource list display field 1520 is a field for displaying the related-resource list. Identification names of resources are displayed in a list format on the related-resource list display field 1520.

The bottleneck candidate list display field 1530 is a field for displaying a bottleneck candidate list. The bottleneck candidate list display field 1530 includes one or more entries each formed of a selection button 1531, a metric 1533, and a correlation coefficient 1534. The resource name 1532 and the metric 1533 are the same fields as the resource name 301 and the metric 702. The correlation coefficient 1534 is a field that stores a correlation coefficient calculated in Step S403. The selection button 1531 is a button for selecting a metric value to be displayed on the graph display field 1540.

The graph display field 1540 is a field for displaying pieces of time-series data on the metric value and estimated metric value of the monitored metric corresponding to an entry for which the selection button 1531 is operated. In FIG. 15, the solid line indicates time-series data on the metric value read out from the metric value history information 145, and the broken line indicates time-series data on the estimated metric value.

Figure 16:
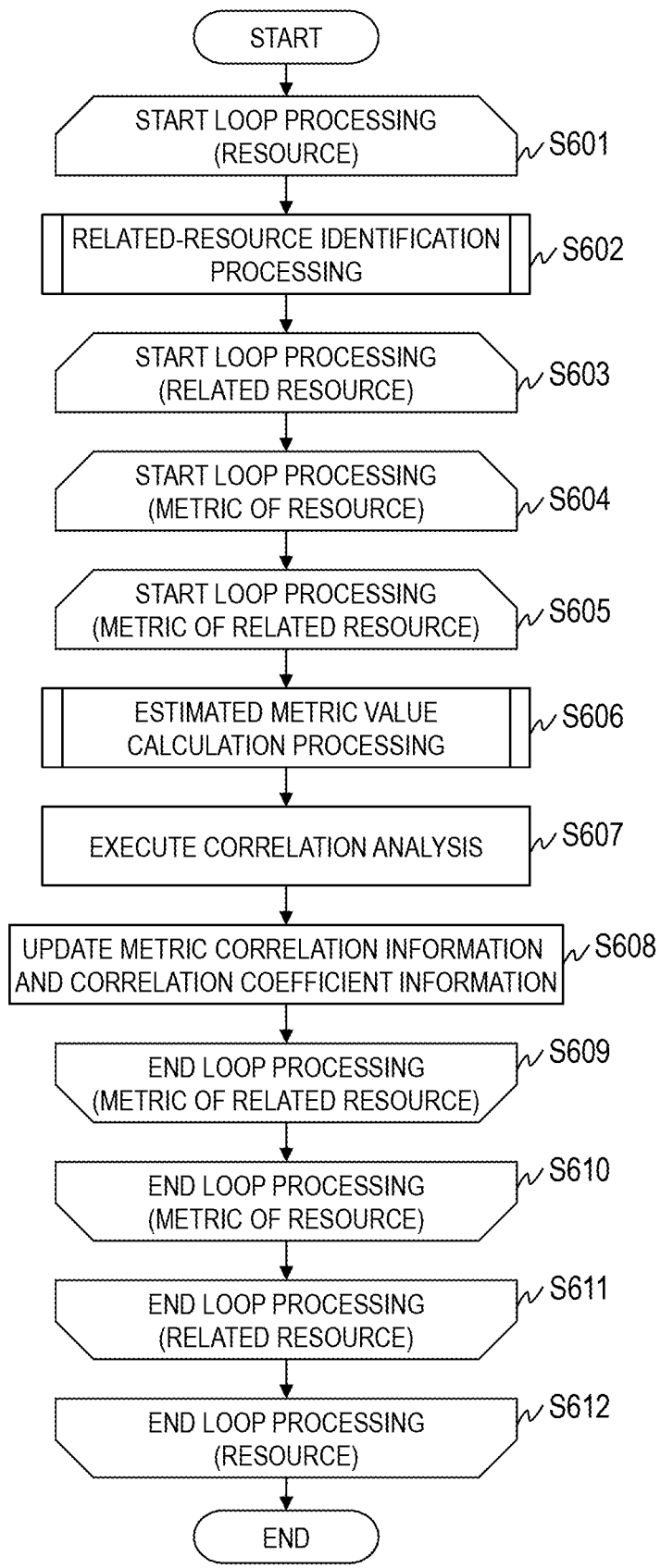
FIG. 16 is a flowchart for illustrating an example of processing of updating the metric correlation information and the correlation coefficient information to be executed by the management server in the first embodiment.

Next, a description is given of processing of updating the metric correlation information 143 and the correlation coefficient information 144. FIG. 16 is a flowchart for illustrating an example of the processing of updating the metric correlation information 143 and the correlation coefficient information 144 to be executed by the management server 100 in the first embodiment.

The management server 100 periodically executes processing described below. The management server may execute the processing in a case where receiving a command from the user.

The correlation information generation module 123 of the management server 100 starts loop processing for a resource (Step S601).

Specifically, the correlation information generation module 123 selects one resource from the configuration information 141. For example, a method of selecting a resource in order from higher entries is conceivable.

Next, the correlation information generation module 123 executes the related-resource identification processing (Step S602). The related-resource identification processing is the same as the processing illustrated in FIG. 11, and thus a description thereof is omitted here.

Next, the correlation information generation module 123 starts loop processing for a related resource (Step S603).

Specifically, the correlation information generation module 123 selects one related resource from among related resources registered in the related-resource list.

Next, the correlation information generation module 123 starts loop processing for a metric of the resource (Step S604).

Specifically, the correlation information generation module 123 selects one metric from among metrics of the resource. In the following description, the metric selected in Step S604 is referred to as a "first target metric".

Next, the correlation information generation module 123 starts loop processing for a metric of the related resource (Step S605).

Specifically, the correlation information generation module 123 selects one metric from among metrics of the related resource. In the following description, the metric selected in Step S605 is referred to as a "second target metric".

Next, the correlation information generation module 123 instructs the metric value estimation module 125 to execute the estimated metric value calculation processing (Step S606). The correlation information generation module 123 is in a standby state until the metric value estimation module 125 outputs the estimated metric value of the first target metric.

The flow of the estimated metric value calculation processing is the same as the estimated metric value calculation processing described with reference to FIG. 14. However, in Step S501, the metric value estimation module 125 obtains time-series data on the metric value of the second target metric. Further, in Step S502, the metric value estimation module 125 uses the time-series data on the metric value of the second target metric to calculate time-series data on the estimated metric value of the first target metric.

Next, the correlation information generation module 123 executes the correlation analysis (Step S607).

Specifically, the correlation information generation module 123 executes the correlation analysis that uses the time-series data on the metric value of the first target metric and the time-series data on the estimated metric value of the first target metric to calculate the correlation coefficient.

Next, the correlation information generation module 123 updates the metric correlation information 143 and the correlation coefficient information 144 (Step S608). Specifically, the following processing is executed.

In a case where the metric correlation information 143 and the correlation coefficient information 144 are not generated, the correlation information generation module 123 generates data in a matrix format having the resource metric as its row and the related-resource metric as its column. The correlation information generation module 123 sets identification information in a cell corresponding to a combination of the first target metric and the second target metric. Further, the correlation information generation module 123 adds an entry to the correlation coefficient information 144, and sets values in the correlation coefficient ID 601 and the correlation coefficient 602 of the added entry.

In a case where the metric correlation information 143 and the correlation coefficient information 144 are generated, the correlation information generation module 123 determines whether identification information is set in the cell corresponding to a combination of the first target metric and the second target metric.

In a case where identification information is not set in the cell, the correlation information generation module 123 sets identification information in the cell. Further, the correlation information generation module 123 adds an entry to the correlation coefficient information 144, and sets values in the correlation coefficient ID 601 and the correlation coefficient 602 of the added entry.

In a case where identification information is set in the cell, the correlation information generation module 123 refers to the correlation coefficient information 144, and searches for an entry corresponding to the identification information set in the cell. The correlation information generation module 123 sets a value in the correlation coefficient 602 of the retrieved entry. This concludes the description of the processing of Step S608.

Next, the correlation information generation module 123 determines whether the processing is complete for all the metrics of the related resource (Step S609).

In a case where it is determined that the processing is not complete for all the metrics of the related resource, the correlation information generation module 123 returns to Step S605, and selects a next metric to execute similar processing.

In a case where it is determined that the processing is not complete for all the metrics of the related resource, the correlation information generation module 123 determines whether the processing is complete for all the metrics of the resource (Step S610).

In a case where it is determined that the processing is not complete for all the metrics of the resource, the correlation information generation module 123 returns to Step S604, and selects a next metric to execute similar processing.

In a case where it is determined that the processing is complete for all the metrics of the resource, the correlation information generation module 123 determines whether the processing is complete for all the related resources (Step S611).

In a case where it is determined that the processing is complete for all the related resources, the correlation information generation module 123 returns to Step S603, and selects a next related resource to execute similar processing.

In a case where it is determined that the processing is complete for all the related resources, the correlation information generation module 123 determines whether the processing is complete for all the resources (Step S612).

In a case where it is determined that the processing is not complete for all the resources, the correlation information generation module 123 returns to Step S601, and selects a next related resource to execute similar processing.

In a case where it is determined that the processing is complete for all the resources, the correlation information generation module 123 ends the processing.

As described above, according to the first embodiment, it is possible to quickly identify the bottleneck by performing analysis on narrowed-down metrics highly correlated with the monitored metric of the monitored resource. Further, the metric correlation information 143 and the correlation coefficient information 144 can be periodically updated to narrow down metrics in consideration of the operation state of the system to be monitored.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, and Java (registered trademark).

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A computer configured to identify one or more bottleneck candidates and to manage a resource for which a metric being an indicator for evaluating performance of the resource is to be measured, the computer comprising:
a processor;
a storage apparatus coupled to the processor; and
an interface coupled to the processor,
the computer being coupled to, via the interface, a management target system including a plurality of computation resources,
the storage apparatus storing correlation information for managing correlation coefficients indicating degrees of correlation between metrics, and
the computer being configured to:
detect a change in performance of the management target system to identify a bottleneck of the management target system based on a metric value of a monitored metric of a monitored resource of the plurality of computation resources of the management target system;
identify at least one related resource of the plurality of computation resources of the management target system having a coupling relationship with the monitored resource;
identify at least one correlation metric that is correlated with the monitored metric from among metrics of the at least one related resource based on the correlation information;
identify a combination of the at least one related resource and the at least one correlation metric as a bottleneck candidate;
calculate an estimated metric value of the monitored metric through use of a metric value of the at least one correlation metric;
execute statistical analysis that uses an actually measured metric value of the monitored metric and the estimated metric value of the monitored metric;
determine whether the at least one correlation metric influences the monitored metric based on a result of the statistical analysis; and
generate notification information for notifying the bottleneck candidate, and output the notification information comprising displaying the bottleneck candidate in a bottleneck candidate display field.

2. The computer according to claim 1,
wherein the storage apparatus stores function information for managing a conversion function that converts the metric value of the at least one correlation metric into the metric value of the monitored metric, and
wherein the computer is configured to:
refer to the function information to identify a first conversion function, which converts the metric value of the at least one correlation metric into the metric value of the monitored metric for calculating the estimated metric value of the monitored metric; and
substitute the metric value of the at least one correlation metric into the first conversion function to calculate the estimated metric value of the monitored metric.

3. The computer according to claim 2, wherein the computer is configured to:
calculate a first correlation coefficient by executing correlation analysis for correlation between the actually measured metric value of the monitored metric and the estimated metric value of the monitored metric;
identify the at least one correlation metric that influences the monitored metric based on a result of comparison between the first correlation coefficient and a threshold value; and
identify a combination of the at least one related resource and the identified at least one correlation metric as the bottleneck candidate.

4. The computer according to claim 2, wherein the computer is configured to:
calculate a first correlation coefficient by executing correlation analysis for correlation between the actually measured metric value of the monitored metric and the estimated metric value of the monitored metric;
obtain a second correlation coefficient for correlation between the metric value of the monitored metric and the metric value of the at least one correlation metric;
identify the at least one correlation metric that influences the monitored metric based on a difference between the first correlation coefficient and the second correlation coefficient; and
identify a combination of the at least one related resource and the identified at least one correlation metric as the bottleneck candidate.

5. A bottleneck identification method to be executed by a computer configured to identify one or more bottleneck candidates and manage a resource for which a metric being an indicator for evaluating performance of the resource is to be measured,
the computer including:
a processor;
a storage apparatus coupled to the processor; and
an interface coupled to the processor,
the computer being coupled to, via the interface, a management target system including a plurality of computation resources,
the storage apparatus storing correlation information for managing correlation coefficients indicating degrees of correlation between metrics,
the bottleneck identification method including:
a first step of detecting, by the computer, a change in performance of the management target system to identify a bottleneck of the management target system based on a metric value of a monitored metric of a monitored resource of the plurality of computation resources of the management target system;
a second step of identifying, by the computer, at least one related resource of the plurality of computation resources of the management target system having a coupling relationship with the monitored resource;
a third step of identifying, by the computer, at least one correlation metric that is correlated with the monitored metric from among metrics of the at least one related resource based on the correlation information;
a fourth step of identifying, by the computer, a combination of the at least one related resource and the at least one correlation metric as a bottleneck candidate; and
a fifth step of generating, by the computer, notification information for notifying of the bottleneck candidate, and outputting the notification information comprising displaying the bottleneck candidate in a bottleneck candidate display field,
wherein the fourth step includes:

a sixth step of calculating, by the computer, an estimated metric value of the monitored metric through use of a metric value of the at least one correlation metric:

a seventh step of executing, by the computer, statistical analysis that uses an actually measured metric value of the monitored metric and the estimated metric value of the monitored metric; and an eighth step of determining, by the computer, whether the at least one correlation metric influences the monitored metric based on a result of the statistical analysis.

6. The bottleneck identification method according to claim 5, wherein the storage apparatus stores function information for managing a conversion function that converts the metric value of the at least one correlation metric into the metric value of the monitored metric, and wherein the sixth step includes:

referring, by the computer, to the function information to identify a first conversion function, which converts the metric value of the at least one correlation metric into the metric value of the monitored metric for calculating the estimated metric value of the monitored metric; and substituting, by the computer, the metric value of the at least one correlation metric into the first conversion function to calculate the estimated metric value of the monitored metric.

7. The bottleneck identification method according to claim 6, wherein the seventh step includes calculating, by the computer, a first correlation coefficient by executing correlation analysis for correlation between the actually measured metric value of the monitored metric and the estimated metric value of the monitored metric, and wherein the eighth step includes:

identifying, by the computer, the at least one correlation metric that influences the monitored metric based on a result of comparison between the first correlation coefficient and a threshold value; and identifying, by the computer, a combination of the at least one related resource and the identified at least one correlation metric as the bottleneck candidate.

8. The bottleneck identification method according to claim 6, wherein the seventh step includes calculating, by the computer, a first correlation coefficient by executing correlation analysis for correlation between the actually measured metric value of the monitored metric and the estimated metric value of the monitored metric, and wherein the eighth step includes:

obtaining, by the computer, a second correlation coefficient for correlation between the metric value of the monitored metric and the metric value of the at least one correlation metric;

identifying, by the computer, the at least one correlation metric that influences the monitored metric based on a difference between the first correlation coefficient and the second correlation coefficient; and identifying, by the computer, a combination of the at least one related resource and the identified at least one correlation metric as the bottleneck candidate.

9. A non-transitory computer readable storage medium having stored thereon a program for causing a computer to identify one or more bottleneck candidates and manage a resource for which a metric being an indicator for evaluating performance of the resource is to be measured, the computer being coupled to a management target system including a plurality of computation resources, an storage apparatus storing correlation information for managing correlation coefficients indicating degrees of correlation between metrics, the program causing the computer to execute:

a first procedure of detecting a change in performance of the management target system to identify a bottleneck of the management target system based on a metric value of a monitored metric of a monitored resource of the plurality of computation resources of the management target system;

a second procedure of identifying at least one related resource of the plurality of computation resources of the management target system having a coupling relationship with the monitored resource;

a third procedure of identifying at least one correlation metric that is correlated with the monitored metric from among metrics of the at least one related resource based on the correlation information;

a fourth procedure of identifying a combination of the at least one related resource and the at least one correlation metric as a bottleneck candidate; and a fifth procedure of generating notification information for notifying of the bottleneck candidate, and outputting the notification information comprising displaying the bottleneck candidate in a bottleneck candidate display field, wherein the fourth procedure includes:

a sixth procedure of calculating an estimated metric value of the monitored metric through use of a metric value of the at least one correlation metric;

a seventh procedure of executing statistical analysis that uses an actually measured metric value of the monitored metric and the estimated metric value of the monitored metric; and an eighth procedure of determining whether the at least one correlation metric influences the monitored metric based on a result of the statistical analysis.

10. The non-transitory computer readable storage medium having the program stored thereon according to claim 9, wherein the computer stores function information for managing a conversion function that converts the metric value of the at least one correlation metric into the metric value of the monitored metric, and wherein the sixth procedure includes the procedures of:

referring to the function information to identify a first conversion function, which converts the metric value of the at least one correlation metric into the metric value of the monitored metric for calculating the estimated metric value of the monitored metric; and substituting the metric value of the at least one correlation metric into the first conversion function to calculate the estimated metric value of the monitored metric.

11. The non-transitory computer readable storage medium having the program stored thereon according to claim 10, wherein the seventh procedure includes a procedure of calculating a first correlation coefficient by executing correlation analysis for correlation between the actually measured metric value of the monitored metric and the estimated metric value of the monitored metric, and wherein the eighth procedure includes the procedures of:

identifying the at least one correlation metric that influences the monitored metric based on a result of comparison between the first correlation coefficient and a threshold value; and identifying a combination of the at least one related resource and the identified at least one correlation metric as the bottleneck candidate.

12. The non-transitory computer readable storage medium having the program stored thereon according to claim 10, wherein the seventh procedure includes a procedure of calculating a first correlation coefficient by executing correlation analysis for correlation between the actually measured metric value of the monitored metric and the estimated metric value of the monitored metric, and wherein the eighth procedure includes the procedures of:
obtaining a second correlation coefficient for correlation between the metric value of the monitored metric and the metric value of the at least one correlation metric;

identifying the at least one correlation metric that influences the monitored metric based on a difference between the first correlation coefficient and the second correlation coefficient; and identifying a combination of the at least one related resource and the identified at least one correlation metric as the bottleneck candidate.

* * * * *